S. A. WHITEHOUSE.
VALVE STRUCTURE.
APPLICATION FILED DEC. 23, 1912.
1,084,185.
Patented Jan. 13, 1914.
2 SHEETS—SHEET 1.
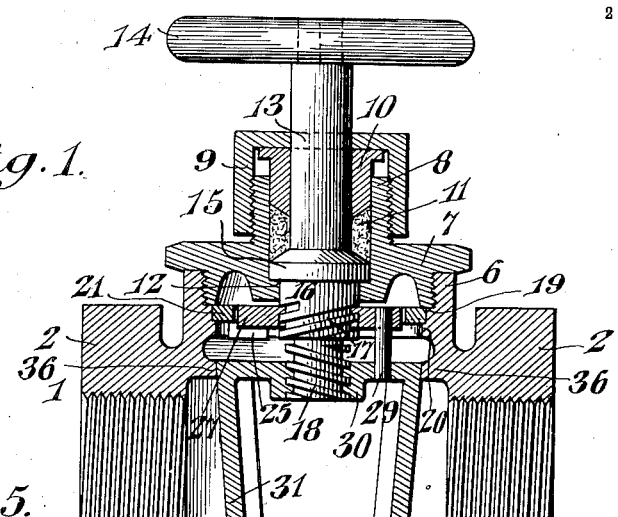
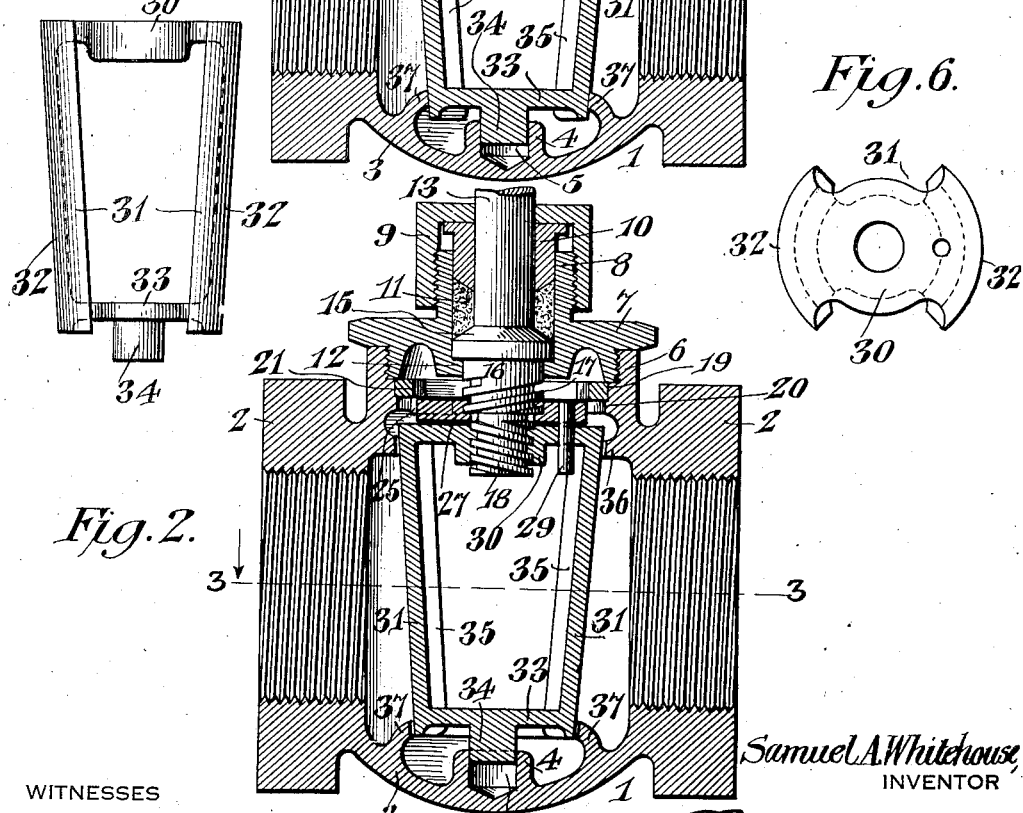
Samuel A. Whitehouse,
INVENTOR
WITNESSES
BY
ATTORNEY S. A. WHITEHOUSE.
VALVE STRUCTURE.
APPLICATION FILED DEC. 23, 1912.
1,084,185.
Patented Jan. 13, 1914.
2 SHEETS—SHEET 2.
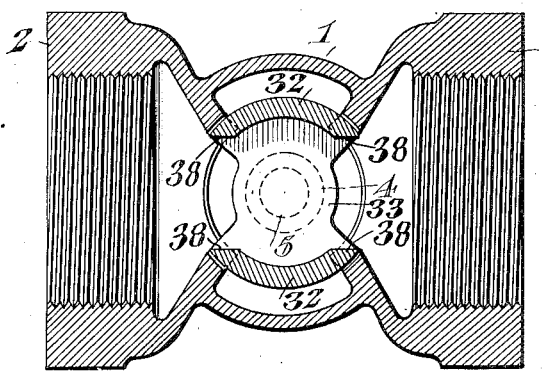
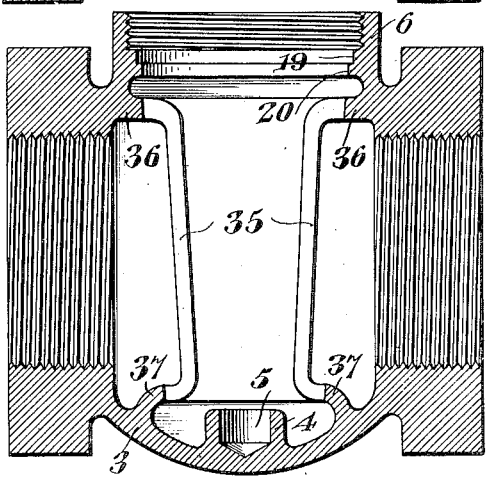
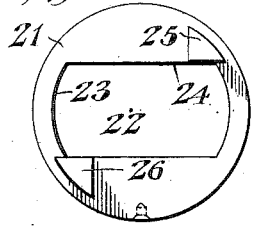
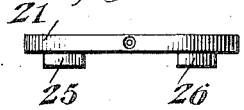
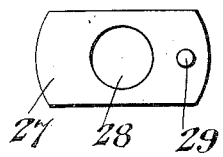
WITNESSES
Samuel A. Whitehouse,
INVENTOR
ATTORNEY

UNITED STATES PATENT OFFICE.

SAMUEL A. WHITEHOUSE, OF CHICAGO, ILLINOIS.

VALVE STRUCTURE.

1,084,185.  Specification of Letters Patent.  Patented Jan. 13, 1914.

Application filed December 23, 1912. Serial No. 738,256.

*To all whom it may concern:*

Be it known that I, SAMUEL A. WHITEHOUSE, a citizen of the United States, residing at Chicago, in the county of Cook and State of Illinois, have invented a new and useful Valve Structure, of which the following is a specification.

This invention has reference to improvements in valves, and its object is to provide a valve having the advantages of the globe valve, the gate valve, the spigot valve and others, while avoiding some of the disadvantages of such types of valves.

The valve of the present invention is provided with a body member or casing which in general is common to several types of valve, a manipulating handle and stem similar to that of certain types of gate and globe valves and a closing member or valve proper acting in a manner similar to a gate valve, and also in a manner similar to a spigot valve.

The valve structure of the present invention is provided with a valve member rotatable on an axis perpendicular to the longitudinal axis of the valve structure and at the same time movable lengthwise of the axis of rotation, while the seat for the valve member is of reduced or limited area. As a result of this construction the valve member on opening first moves from its seat in the direction of the axis of rotation, and is then turned through an arc of about ninety degrees until a passageway provided through the valve member is in line with the ends of the valve casing, thus providing a free passageway through the valve casing of a size approaching that of the gate valve. At the same time the initial movement of the valve loosens it from its seat similar to the action of a globe valve, whereupon the pressure begins to equalize on opposite sides of the valve and the remaining movement is easily accomplished. On closing the valve the reverse operation takes place and when contact is established in a manner similar to a globe valve, but with a movement like that of a gate valve where there is a wedging of the valve member in its seat.

The limited area of the seat for the valve member renders accurate fitting by grinding unnecessary, and in this respect differing from a spigot valve where the spigot member must be well fitted to the seat in order to prevent leakage.

The invention will be best understood from a consideration of the following detailed description, taken in connection with the accompanying drawings forming a part of this specification, with the further understanding that while the drawings show a practical embodiment of the invention, the latter is not limited to any strict conformity with the showing of the drawings, but may be changed and modified so long as such changes and modifications mark no material departure from the salient features of the invention.

In the drawings:—Figure 1 is a longitudinal diametric section of a valve structure embodying the present invention, the section being taken in a plane coincident with the axis of rotation of the valve member, the latter being shown in the closed position. Fig. 2 is a view similar to Fig. 1 but with the valve member in the preliminary open position. Fig. 3 is a cross section on the line 3—3 of Fig. 2, but showing the valve member in the full open position. Fig. 4 is a section similar to that of Fig. 1 but limited to the valve casing. Fig. 5 is an elevation of the valve member by itself. Fig. 6 is a plan view of the structure shown in Fig. 5. Fig. 7 is an inverted plan view of a disk member employed in the valve. Fig. 8 is an edge view of the structure of Fig. 7 in the uninverted position. Fig. 9 is a plan view of a plate designed to coact with the structure of Fig. 7.

In the drawings there is shown a valve casing 1 which in external form may be similar to the ordinary globe valve, and is provided with the usual internally threaded terminal necks 2 for the attachment of the valve structure to pipes, but because of the construction of the valve the body of the casing may be thinner than is customary in globe valves, as will appear from the cross section of Fig. 3.

Considering the valve structure as installed in an upright position and attached to horizontally disposed pipe, the bottom portion of the valve casing between the necks 2 may be rounded out, as indicated at 3, and at the central portion this rounded out part has formed on its inner wall a stud or boss 4 in which there is provided a seat or bore 5, the longitudinal axis of which is perpendicular to the longitudinal axis of the necks 2.

At what may be termed the top of the casing, that is, the portion diametrically opposite the boss 4, the casing is formed with another neck 6 having its outer end internally threaded for the reception of a bonnet 7 in turn provided with a centralized neck 8 externally threaded for a cap nut 9 shaped to hold a follower 10 in the neck, so as to retain packing 11 therein. At what may be termed the inner end of the bonnet the packing space is terminated by an inturned annular shoulder 12. Confined in the neck 8 by the packing and packing gland is a valve stem 13 having at its outer or accessible end a hand wheel 14 or other handle whereby the valve stem may be readily rotated. This stem where extending through the packing gland is formed or provided with an external annular flange 15 of a size to engage the shoulder 12, and in turn be engaged by the packing 11 or other means, so that while the valve stem may be readily rotated it is held against longitudinal movement by the packing. That end of the valve stem 13 remote from the hand wheel 14 and immediately adjacent the flange 15 is diametrically enlarged, as indicated at 16, and there externally screw-threaded, as indicated at 17, and the valve stem is continued beyond the enlarged portion 16 in an externally threaded axial extension 18 of smaller diameter than the portion 16. The screw threads of the portion 18 are in an opposite direction to the threads 17 on the portion 16, this arrangement being for a purpose which will presently appear. The valve stem with the flange 15, enlargement 16 and extension 18 may be all formed in one piece or at least is effectively integral throughout.

The interior of the neck 6 is provided with an annular shoulder 19 and interior to this shoulder and spaced therefrom toward the inside of the casing is another shoulder 20 also annular. The last-named shoulder provides a seat for a disk 21 of a thickness to reach to the shoulder 19 when resting on the shoulder 20, and this disk is clamped to the shoulder 20 by the threaded portion of the bonnet 7 which is made of a length to perform such office. The disk 21 has a centrally located opening 22 therethrough, which opening is longer in one direction than the other and in the longer direction approaches comparatively close to the rim of the disk where the ends of the opening are rounded, as indicated at 23 each on an arc struck from the center of the disk. The long sides of the opening indicated at 24 are shown as parallel with a diameter intersecting the arcs 23, and join the corresponding ends of the arcs. While the opening 22 is shown in the general form of an elongated rectangle with rounded ends, this opening may be of any other shape suitable for the purpose for which the opening is intended, which purpose will hereinafter appear. At diagonally opposite corners of the opening 22 and carried by the body of the disk are lugs 25, 26, respectively, these lugs being shown in the form of right-angle segments, but such shape is not at all obligatory, the purpose of the lugs being to serve as stops.

Applied to the threaded portion 17 of the enlargement 16 is a plate 27 conforming in shape to the opening 22 in the disk 21, and related thereto so as to fit the opening 22 quite closely and yet freely. The plate 27 which is shown separately in Fig. 9 has a central passage 28 appropriately threaded to receive the threads 17 of the enlargement 16. Near one end the plate 27 carries a pin 29, perpendicular to the plate, or other means for the purpose may be used.

The threaded extension 18 of the valve stem enters a threaded head 30 at one end of a taper valve 31 having oppositely disposed arc shaped wings 32 connected together at one end by the head 30 and at the other end by another head 33, which latter is provided with a central axially extended stud 34 adapted to the passage 5 in the boss 4 and fitting the latter snugly yet freely.

Extending from the inner end of the neck 6 to the bottom portion 3 of the casing are oppositely disposed pairs of ribs 35 which may be integral with the inner wall of the casing and appropriately offset therefrom; these ribs merging at the ends into circular flanges 36, 37, respectively, at the top and bottom of the interior of the casing. These edges of the ribs 35 presented toward the interior of the casing are curved and tapered with respect to the longitudinal axis of the valve stem and of the valve 31 carried thereby to conform to the taper shape of the wings 32, and the ribs 35 are so disposed that when the valve 31 is turned in a direction which shall cause the wings 32 to bridge the spaces between ribs 35 on opposite sides of the central longitudinal axis of the casing, the long edges of the respective wings will seat against the ribs and so coacting with the wings close the passage through the valve casing. When the valve member 31 is turned from the closed position through an arc of about ninety degrees, the wings 32 then span the respective pairs of ribs on opposite sides of the central longitudinal axis of the casing and the interior edges of the wings 32 being beveled, as indicated at 38, there is provided a passage through the valve casing and through the valve member between the wings substantially equal to the spacing apart of the ribs 35 with respect to the central longitudinal axis of the casing.

The closed position of the valve structure is shown in Fig. 1, in which the plate 27 is indicated as lodged in the passage 22 and the valve member 31 is so disposed that the wings 32 are in closing relation to the passage through the valve and, moreover, their edges are in firm seating relation to the ribs 35, while the ends of these wings are in firm seating relation to the flanges 36 and 37, respectively. The passage through the valve is therefore sealed at all points where the ribs 35 and flanges 36 are engaged by the valve member 31, and this valve member because of its arrangement and function may be termed a skeleton plug valve, or spigot valve. Under the conditions just assumed the plate 27 and the corresponding head 30 of the valve plug are separated to the greatest extent. Suppose, now, that it is desirable to open the valve. The valve stem is turned by means of the hand wheel 14 in the proper direction which in the structure shown is counterclockwise to an operator manipulating the valve stem, and the first action of the valve stem is to screw the extension 18 into the head 30 of the plug 31, thus moving the latter longitudinally toward the valve stem, since the latter is incapable of longitudinal movement, and at the same time the action of the threads 17 upon the plate 27 is to move this plate in the passage 22 in a direction away from the bonnet 7 and toward the oncoming valve plug 31. The plate 27 so long as it is within the passage 22 cannot rotate because of the non-circular shape of the passage and plate, nor can the valve plug 31 rotate because of the pin 29 connecting the plate 27 with the valve plug, but this pin connection does not interfere with the approach of the plate 27 and valve plug 31. This approach of the plate and plug continues so long as the plate 27 remains within the passage 22, but by the time the plate escapes from the passage 22 the said plate and valve plug are brought into sufficiently close engagement to cause them to lock on the valve stem so that further rotative movement of the valve stem will be participated in by both the plate and valve plug, and this movement is continued until the appropriate edge of the plate 27 engages the lug 25 and is stopped thereby, this position marking the open position of the valve.

When it is desired to close the valve the valve stem is rotated in the opposite direction which carries the plate 27 and plug 31 rotatively in a clockwise direction until the plate 27 engages the lug 26, thus arresting further rotative movement, but now the continued rotation of the valve stem will cause a separation of the plate 27 and plug 31 in the direction of the longitudinal axis of the stem, so that the plate 27 is moved into the passage 22 and the plug 31 which is now so situated that the wings 32 are transverse of the spaces between the ribs 35 as measured transversely through the longitudinal axis of the valve casing, will move into engagement with the edges of these ribs presented toward the center of the valve casing, this movement being sufficiently extensive to cause the valve plug to seat firmly against the ribs 35 and the flanges 36 and 37, the stem 34 guiding the corresponding end of the valve plug by engagement in the passage or seat 5 and the valve stem guiding the other end of the valve plug.

When the opening movement is begun, the valve plug does not rotate at all but simply moves in the direction of the longitudinal axis of the valve stem, thus at once lifting it from its seat, so that the valve plug is quite loose and fluid under pressure, say water or steam, will find passage all about the plug, thus tending to equalize the pressure on opposite sides of the plug and rendering the further manipulation of the plug easy and the parts are so loosened and separated by the time the valve plug is ready to turn that the turning movement is readily accomplished.

It will be observed that the valve of the present invention has the advantage of the quick opening and closing of the plug or spigot valve type and the non-rubbing seating of the valve or unseating thereof such as is found in the globe and gate type of valves, and the large free opening of the gate type of valve, but without the comparatively massive structure of the latter type of valve, since the valve of the present invention need not be even as large as a globe valve of the same capacity and need not be as large as a spigot valve of the same capacity, while it is much smaller than a gate valve of like capacity. Moreover, the valve of the present invention presents fewer parts and is more readily assembled or taken apart than other valves of similar design.

The release of the valve from its seat before the valve is moved to the full open position provides a limited by-pass particularly adapted for high pressures whereby the pressure is slowly released and equalized before the full volume is permitted to flow through the valve structure.

What is claimed is:—

1. A valve structure comprising a casing with valve seats, a plug valve mounted in the casing and adapted to the seats, a rotatable valve spindle having a mounting in the casing holding it against longitudinal movement, the spindle and valve having direct connections within the casing permitting the rotation of the valve and constructed to cause movements of the latter in both directions lengthwise of the axis of rotation, and connections within the casing between the valve spindle and valve mounted on and constructed to be moved by the spindle toward and from the valve in the direction of its longitudinal axis of rotation and in opposition to the longitudinal movements of the valve.

2. In a valve structure, a casing, a rotatable valve mounted therein for movement lengthwise of its axis of rotation, a holding member for the valve, means for causing movements of both the valve and holding member longitudinally and rotatively with respect to the axis of rotation of the valve, the longitudinal movements of the valve and holding member being in opposite directions, and means for maintaining the holding member against rotation during its movements lengthwise of the axis of rotation of the valve.

3. A valve structure comprising a suitable casing, a rotatable valve mounted therein and having a range of movement in the direction of the axis of rotation, a member connected to the valve for rotation therewith and movable toward and from the valve in the direction of the axis of rotation, a holding device for said member into and out of engagement with which it is movable, and a rotatable valve stem having means for holding it against longitudinal movements and also having means in engagement with both the valve and the member connected therewith for imparting approaching and receding movements to said valve and member and rotative movements thereto when the member is disengaged from its seat.

4. A valve structure comprising a suitable casing, a plug valve mounted therein for rotation and longitudinal movement, a seating device mounted in the casing, a valve spindle extending through the seating device and provided with oppositely directed threads, the valve being threaded to receive one set of threads of the spindle, and a plate threaded to receive the other set of threads of the spindle and movable thereby into and out of engagement with the seating device and toward and from the valve, the said plate and valve having connections for holding them in fixed relation with respect to rotative movements.

5. A valve structure provided with a casing having a passage therethrough and with oppositely disposed valve seats spaced apart in the direction of the longitudinal axis of said passage, said casing being provided to one side of the passage with a socket member and on the opposite side of said passage with a neck, a bonnet adapted to said neck and provided with a packing gland, a valve stem mounted in said gland for rotative movements but held thereby against longitudinal movements, said valve stem having oppositely directed screw threads within the casing, a seating member lodged in the neck of the casing, a plate having a screw threaded portion traversed by one of the threaded portions of the spindle and movable thereby into and out of the seating member in the direction of the longitudinal axis of the spindle, and a plug valve adapted to the valve seats in the casing, said valve having at one end a threaded passage for the reception of the other threaded portion of the spindle and at the other end an axial extension adapted to the socket at the corresponding portion of the casing, the plate carried by the spindle and the valve having connections permitting them to approach and recede but holding them in fixed relation with respect to the rotation of the valve.

6. A valve structure provided with a casing having a passage therethrough and with oppositely disposed valve seats spaced apart in the direction of the longitudinal axis of said passage, said casing being provided to one side of the passage with a socket member and on the opposite side of said passage with a neck, a bonnet adapted to said neck and provided with a packing gland, a valve stem mounted in said gland for rotative movements but held thereby against longitudinal movements, said valve stem having oppositely directed screw threads within the casing, a seating member lodged in the neck of the casing, a plate having a screw threaded portion traversed by one of the threaded portions of the spindle and movable thereby into and out of the seating member in the direction of the longitudinal axis of the spindle, and a plug valve adapted to the valve seats in the casing, said valve having at one end a threaded passage for the reception of the other threaded portion of the spindle and at the other end an axial extension adapted to the socket at the corresponding portion of the casing, the plate carried by the spindle and the valve having connections permitting them to approach and recede but holding them in fixed relation with respect to the rotation of the valve, said valve tapering longitudinally and comprising oppositely disposed wings and terminal connecting heads defining a passage through the valve approximately equal in area to the area inclosed by either valve seat of the casing.

7. A valve structure provided with a rotatable valve mounted for movement in the direction of its axis of rotation, a holding member for the valve also movable in the direction of said axis of rotation and connected to the valve for rotation therewith, means for causing the holding member and valve to approach and recede and for rotating said member and valve, and means for restraining the holding member and valve from rotation except when brought together.

8. A valve structure having a casing and a rotatable valve movable in the casing to open or closed position and mounted for movement in the direction of its axis of rotation for seating or unseating it in accordance with the direction of such longitudinal movement, a rotatable valve stem, and means for holding it against longitudinal movement, said stem having reverse screw threads and the valve having a threaded head receiving one threaded portion of the stem, and means for holding the valve against rotation during its longitudinal movement comprising a member engaged by the other threaded portion of the valve stem and connected to the valve, stop means on the last-named member, and coacting stop means in fixed relation to the casing for holding the valve against rotation during its longitudinal movement.

9. A valve structure having a rotatable valve mounted for movement in the direction of its axis of rotation, a member adjacent one end of the valve and having a non-circular seat therein with oppositely disposed stop members exterior to the seat, a plate connected to the valve for rotation therewith and movable into and out of the seat and conforming to said seat to hold the plate against rotation when in the seat, and means for causing the plate and valve to approach or recede and to rotate when in the approached position.

10. A valve structure comprising a suitable casing, a valve mounted therein for movement both rotatively and longitudinally, a valve stem mounted in the casing for rotation and provided with oppositely directed screw threads, one set of threads engaging the valve for causing its longitudinal movement in either direction, a plate traversed by the other screw threaded portion of the valve stem for causing movements of the plate toward and from the valve, and a member with a passage therein for receiving the plate and beyond which member the plate is movable by the valve stem, said plate and valve being connected for movements toward and from each other and simultaneous rotation, and stop members in the path of the plate when in close approach to the valve for limiting the rotative movement of the valve in either direction.

In testimony, that I claim the foregoing as my own, I have hereto affixed my signature in the presence of two witnesses.

SAMUEL A. WHITEHOUSE.

Witnesses:
   HENRY F. THUMANN,
   JOHN T. BRULIE.